May 1, 1934. C. PAYNE 1,956,745
LOCKING BOLT
Filed Oct. 3, 1932
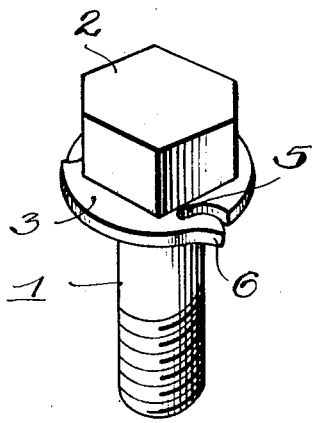
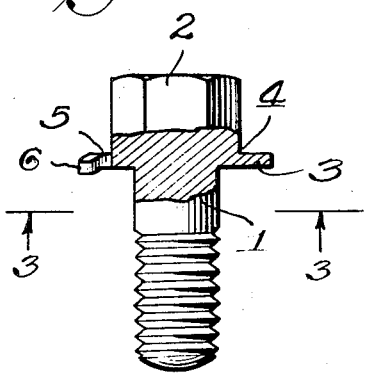
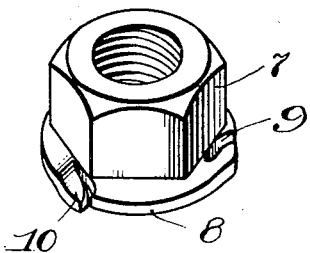
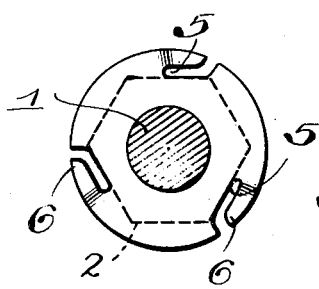
Inventor,
Caleb Payne, Patented May 1, 1934

1,956,745

UNITED STATES PATENT OFFICE 1,956,745

LOCKING BOLT

Caleb Payne, Chicago, Ill.

Application October 3, 1932, Serial No. 635,946

3 Claims. (Cl. 151—37)

This invention relates to improvements in locking bolts, and particularly to a one-piece bolt provided with locking means to prevent the bolt from loosening, once it has been inserted and screwed tightly in place.

The object of the invention is to provide a bolt which will eliminate the necessity of a separate locking member such as a lock washer of any one of several types commonly used, and thus avoid the additional operation of applying a washer as well as the possibility of omitting the application of the same in the assembly of machines or machine parts. Such a bolt, therefore, is especially applicable to mass production methods in which the time alloted to each operation is reduced to a minimum.

The novel features of the invention are applicable to all standard sizes and styles of bolts, the more common type of bolt with a hexagonal head being herein illustrated.

In the drawing,

Figure 1 is a perspective view of the bolt;

Figure 2 is a view of the bolt in side elevation, with a portion shown in section;

Figure 3 is a view in cross section taken on line 3—3 of Figure 2;

Figure 4 is a perspective view of a nut showing the application of the same locking feature thereto.

In common with standard types of bolts, the improved locking bolt consists generally of a threaded shank 1 and a head 2, which in the form shown in Figures 1, 2 and 3, is hexagonal, but which may be any other standard shape. At the base of the head is a radial flange 3 forming an integral part of the bolt. The flange is preferably formed by upsetting the metal at the base of the head, an operation which necessitates the use of somewhat more metal in the blanking operation than would be used in forming an ordinary bolt. In other words, the head is shaped to standard dimensions, and the flange made an integral extension thereof, although if desired, the flange may be the peripheral portion of a disc fitted onto the shank and welded to the bottom of the head.

About the periphery of the flange are formed several slots 5 extending inwardly in a generally tangential direction and to a depth just short of the head. In this manner a pointed tongue or projection 6 is formed by the metal between each slot and the periphery of the flange, and each of these points is upset or bent out of the plane of the flange and in a direction toward the shank end of the bolt, the amount of upset being approximately equal to the thickness of the flange.

The bolt is preferably made of a suitable grade of spring steel so that there is a certain amount of resiliency in the flange and especially the projections or prongs 6 as they may be called. The flange and therefore the prongs are of sufficient thickness to give them the required holding or locking effect which is exerted when the bolt is tightened down to its full extent.

Assuming that the threads on the shank are cut right-handed, the slots are cut so that the prongs trail during the tightening of the bolt, that is to say, if the bolt turns in a clockwise direction when being screwed down, the prongs point in the opposite direction. Thus when the prongs come in contact with the surface of the work being bolted, they are gradually sprung back toward the plane of the flange as the head is drawn against the surface when the bolt is tightened. Manifestly, if the bolt is subsequently rotated in the opposite direction, the pointed prongs then function to lock it against turning by reason of the ability of the sharp edges or pointed ends of the prongs to bite into the surface of the work against which the flange bears. In this manner any tendency for the bolts to loosen due to vibration or other forces which ordinarily cause bolts and nuts to loosen, is counteracted, with the result that once inserted and screwed into place, the bolt will remain tight.

As clearly shown in Figure 4, the same locking feature may be incorporated in a nut 7, such as is intended to be applied to a stud, the nut being tapped for threading onto the stud instead of being integral therewith to form the head of a bolt. Thus the nut 7 has an integral flange 8 with tangentially disposed slots 9 forming the offset prongs 10 as before, which exert the same locking action when turned down tightly against the work.

Manifestly, other arrangements of resilient prongs may be devised for producing the same effective locking or holding action, and therefore I do not wish to be limited to any particular application of the invention.

I claim as my invention:

1. A work fastening member comprising a threaded shank surmounted by a head having an integral flange extending radially from the base thereof, said flange having a slit extending inwardly from the edge thereof and oblique to a radial line through the entrance to the slit, the portion of the flange between the edge of the flange and the slit being bent to form a resilient prong extending in a direction at right angles to said radial line with its end portion depressed below the underside of said flange.

2. A locking bolt comprising a threaded shank having a head provided with an integral annular flange at its base, said flange having slots extending inwardly from its periphery and thence substantially tangentially to the side faces of said head to form resilient prongs having their end portions bent to project below the underside of said flange and pointing in a direction to bite into the surface of the work when the head has been tightened to thereby resist the turning of the same in a direction to become loosened.

3. A locking bolt comprising a threaded shank having a head at one end and an annular flange formed integral with the lower edge thereof, said flange having slots cut to extend inwardly from the edge thereof and thence in a direction generally parallel with the edge of said flange, the portions of the flange between said slots and the edge of the flange being bent to form resilient prongs having their end portions normally depressed below the under side of the flange and in a direction to present their ends to the surface of the work so as to resist the turning of said head to loosen the same.

CALEB PAYNE.